United States Patent
Qiu et al.

(10) Patent No.: US 11,691,521 B2
(45) Date of Patent: *Jul. 4, 2023

(54) AUTONOMOUS VEHICLE FUELING WITH CENTRALIZED SCHEDULING

(71) Applicant: Ford Motor Company, Dearborn, MI (US)

(72) Inventors: Shiqi Qiu, Canton, MI (US); Oliver Lei, Windsor (CA); Jayanthi Rao, West Bloomfield, MI (US); John Robert Van Wiemeersch, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/172,365

(22) Filed: Feb. 10, 2021

(65) Prior Publication Data
US 2021/0170888 A1 Jun. 10, 2021

Related U.S. Application Data

(63) Continuation of application No. 16/332,513, filed as application No. PCT/US2016/051746 on Sep. 14, 2016, now Pat. No. 10,953,759.

(51) Int. Cl.
*G05D 1/02* (2020.01)
*B60L 11/18* (2006.01)
(Continued)

(52) U.S. Cl.
CPC ............... *B60L 53/00* (2019.02); *B60L 15/38* (2013.01); *B60L 53/66* (2019.02); *B60L 53/68* (2019.02);
(Continued)

(58) Field of Classification Search
CPC ... G05D 1/02; B60L 11/18; B60L 9/00; B60L 53/00; G01C 21/00; G01C 21/26;
(Continued)

(56) References Cited

U.S. PATENT DOCUMENTS 5,163,000 A 11/1992 Rogers et al.
6,023,681 A 2/2000 Whitt
(Continued)

FOREIGN PATENT DOCUMENTS

DE 3013080 A1 10/1981
EP 2320385 A1 5/2011
(Continued)

OTHER PUBLICATIONS

Notification of Transmittal of the International Search Report and Written Opinion of the International Searching Authority regarding International Application No. PCT/US2016/051747 dated Nov. 17, 2016 (11 pages).

(Continued)

*Primary Examiner* — Yuri Kan
(74) *Attorney, Agent, or Firm* — Brandon Hicks; Bejin Bieneman PLC (57) ABSTRACT

Vehicles can be equipped to operate in both autonomous and occupant piloted mode. Refueling stations can be equipped to refuel autonomous vehicles without occupant assistance. Refueling stations can be equipped with a fueling control computer that communicates with vehicles via wireless networks to move vehicles between waiting zones, service zones and served zones. Refueling stations can include liquid fuel, compressed gas and electric charging.

20 Claims, 5 Drawing Sheets

(51) Int. Cl.

| | | |
|---|---|---|
| *G01C 21/00* | (2006.01) | |
| *G06F 7/00* | (2006.01) | |
| *B60L 9/00* | (2019.01) | |
| *B60S 5/02* | (2006.01) | |
| *B60L 53/00* | (2019.01) | |
| *G08G 1/127* | (2006.01) | |
| *H04W 4/44* | (2018.01) | |
| *B60L 53/68* | (2019.01) | |
| *B60L 53/66* | (2019.01) | |
| *B67D 7/04* | (2010.01) | |
| *G06F 15/173* | (2006.01) | |
| *B60L 15/38* | (2006.01) | |
| *H04W 4/021* | (2018.01) | |

(52) U.S. Cl.
CPC ......... *B67D 7/0401* (2013.01); *G05D 1/0225* (2013.01); *G05D 1/0276* (2013.01); *G06F 15/173* (2013.01); *G08G 1/127* (2013.01); *H04W 4/021* (2013.01); *H04W 4/44* (2018.02); *B60L 2260/32* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/12* (2013.01)

(58) Field of Classification Search
CPC .. G06F 7/00; B60S 5/02; G06Q 20/20; G08G 1/127
See application file for complete search history.

(56) References Cited

U.S. PATENT DOCUMENTS

| | | | |
|---|---|---|---|
| 6,651,706 | B2 | 11/2003 | Litt |
| 7,523,770 | B2 | 4/2009 | Horowitz et al. |
| 7,726,360 | B2 | 6/2010 | Sato et al. |
| 8,560,216 | B1 | 10/2013 | Kahn et al. |
| 9,377,315 | B2 | 6/2016 | Grover et al. |
| 9,519,284 | B2 * | 12/2016 | Wurman ............ G05B 19/4189 |
| 10,065,517 | B1 * | 9/2018 | Konrardy ........... G01C 21/3461 |
| 10,828,999 | B1 * | 11/2020 | Konrardy ................. B60L 58/12 |
| 10,953,759 | B2 * | 3/2021 | Qiu ........................ G08G 1/127 |
| 2001/0037839 | A1 | 11/2001 | Litt |
| 2005/0176482 | A1 | 8/2005 | Raisinghani et al. |
| 2006/0002413 | A1 | 1/2006 | Tsutazawa et al. |
| 2010/0169008 | A1 | 7/2010 | Niwa et al. |
| 2012/0179323 | A1 | 7/2012 | Profitt-Brown et al. |
| 2012/0316784 | A1 * | 12/2012 | Chrysanthakopoulos .................... G01C 21/005 701/519 |
| 2013/0299042 | A1 | 11/2013 | Nieuwstraten |
| 2013/0339072 | A1 | 12/2013 | Touge |
| 2014/0330623 | A1 | 11/2014 | Detrick |
| 2015/0047947 | A1 | 2/2015 | Tait |
| 2015/0120476 | A1 | 4/2015 | Harrell |
| 2015/0310674 | A1 | 10/2015 | Humphrey et al. |
| 2015/0348335 | A1 | 12/2015 | Ramanujam |
| 2016/0035013 | A1 | 2/2016 | Plattenburg et al. |
| 2016/0167539 | A1 | 6/2016 | Huang et al. |
| 2016/0221453 | A1 | 8/2016 | Bridges et al. |
| 2017/0174092 | A1 * | 6/2017 | Kohnke ................. B60L 53/65 |
| 2017/0240061 | A1 * | 8/2017 | Waters .................... H02J 50/80 |
| 2020/0180571 | A1 * | 6/2020 | Lei ............................ B60S 5/02 |

FOREIGN PATENT DOCUMENTS

| | | |
|---|---|---|
| WO | 2008004755 A1 | 1/2008 |
| WO | 2009041926 A1 | 4/2009 |

OTHER PUBLICATIONS

Notification of Transmittal of the International Search Report and Written Opinion of the International Searching Authority regarding International Application No. PCT/US2016/051746 dated Dec. 12, 2016 (10 pages).
Non-Final Office Action for related U.S. Appl. No. 16/332,495, as issued by the USPTO dated Nov. 5, 2020.
Notice of Allowance for case parent U.S. Appl. No. 16/332,513, filed Mar. 12, 2019, as issued by the USPTO dated Nov. 18, 2020.
CN First Office Action as issued by the Chinese Patent Office dated Jan. 26, 2022 (in Chinese and English).

* cited by examiner

AUTONOMOUS VEHICLE FUELING WITH CENTRALIZED SCHEDULING

CROSS-REFERENCE TO RELATED APPLICATION

This patent application is a continuation of, and as such claims priority to, U.S. patent application Ser. No. 16/332,513, filed on Mar. 12, 2019, which claims priority to PCT Application No. PCT/US2016/051746, filed Sep. 14, 2016, both of which are hereby incorporated herein by reference in their entirety.

BACKGROUND

Vehicles can be equipped to operate in both autonomous and occupant piloted mode. Refueling stations can be equipped to refuel autonomous vehicles without occupant assistance and can include liquid fuel, compressed gas and electric charging.

DETAILED DESCRIPTION

Vehicles can be equipped to operate in both autonomous and occupant piloted mode. By a semi- or fully-autonomous mode, defined more fully below we mean in short a mode of operation wherein a vehicle can be piloted by a computing device as part of a vehicle information system having sensors and controllers. The vehicle can be occupied or unoccupied, but in either case the vehicle can be piloted without assistance of an occupant. Vehicles can be powered by a variety of fuel types, including liquid petroleum- or alcohol-based fuels, compressed gases such as liquefied petroleum or hydrogen, or electricity. For all fuel types, vehicles can be equipped to be refueled at refueling stations.

Refueling stations can be equipped to provide a variety of refueling options including automated and manual fueling, fuel type and filler type/location. Fuels can include liquid petroleum or alcohol fuels, compressed gases or electric charging. Fueling can be fully automated, requiring the vehicle to be in autonomous mode and operable to respond to commands from a fuel pump, or fueling can be manual, requiring some assistance of an attendant or occupant to complete. Vehicles can require refueling while in autonomous mode. Vehicles in autonomous mode can be programmed to locate refueling stations.

Equipping vehicles with wireless networks operative to communicate with other vehicles and fueling control computers associated with refueling stations can permit one or more vehicles in autonomous mode to refuel at the refueling station. In cases where vehicles include occupants, one or more occupant preferences can be communicated to the fueling control computer and other vehicles. Wireless networks can include cellular telephone networks, Wi-Fi, and dedicated short range communications (DSRC) technology including Bluetooth Low Energy (BLE) or other wireless technologies, for example. Fueling control computer can direct one or more vehicles via wireless networks to refuel the vehicles efficiently while satisfying occupant preferences.

Figure 1:
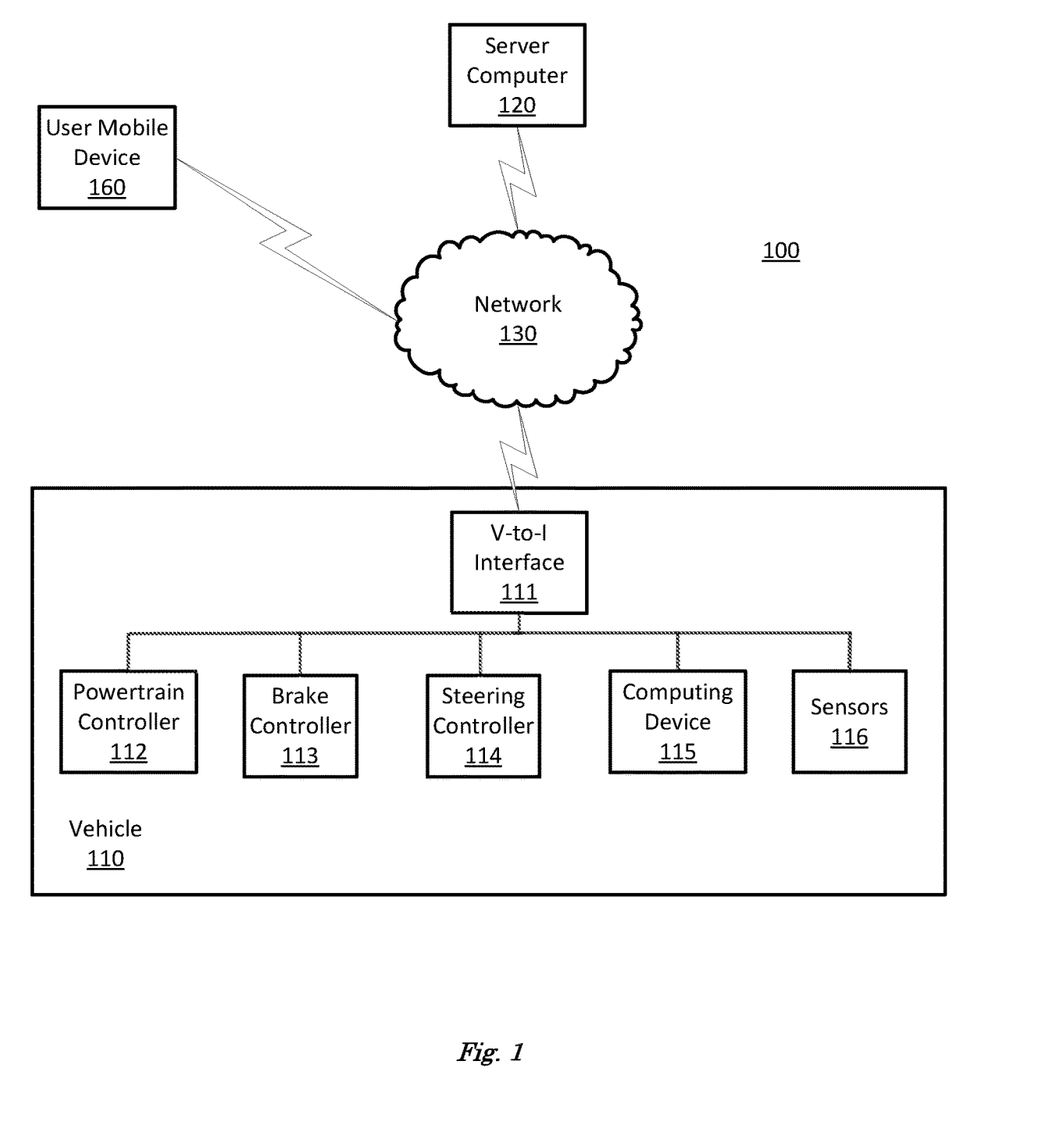
FIG. 1 is a diagram of a vehicle in accordance with disclosed examples.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as are known. Computing device can log information by storing the information in nonvolatile memory for later retrieval and transmittal via the vehicle communication network and V-to-I interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide a geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based vehicle 110 operable in autonomous and occupant piloted mode having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
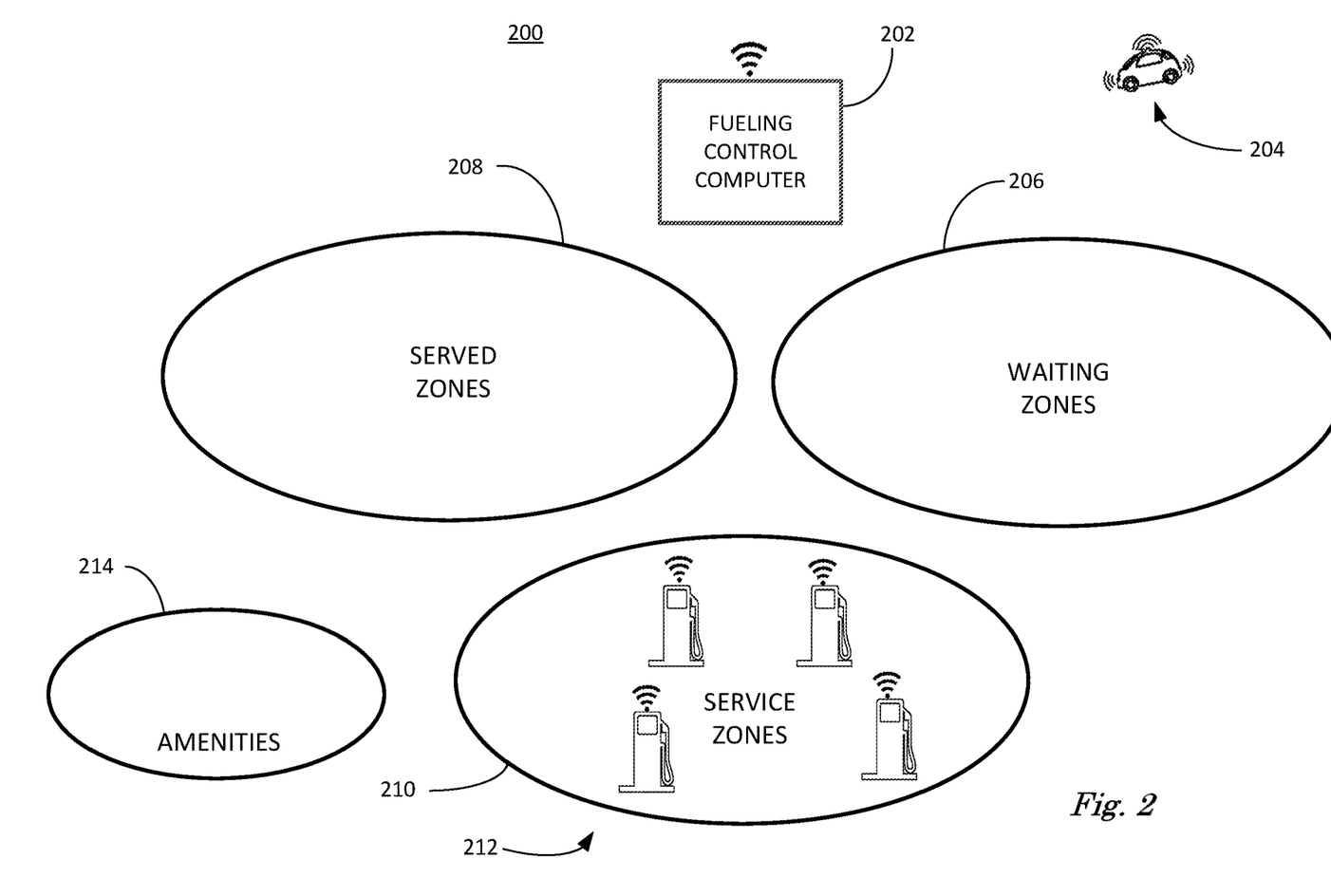
FIG. 2 is a diagram of a refueling station in accordance with disclosed examples.
Figure 3:
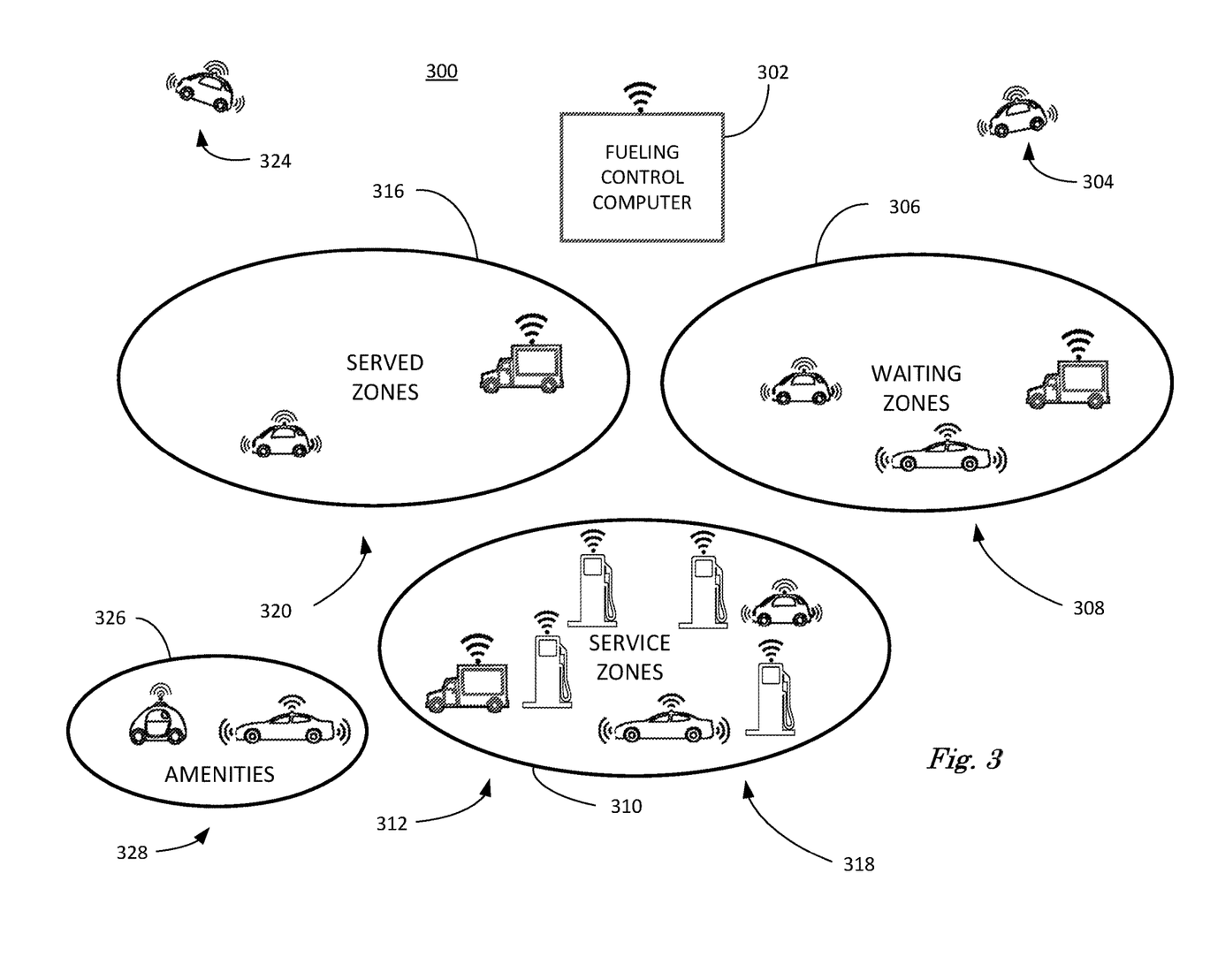
FIG. 3 is a diagram of a refueling station in accordance with disclosed examples.
Figure 4:
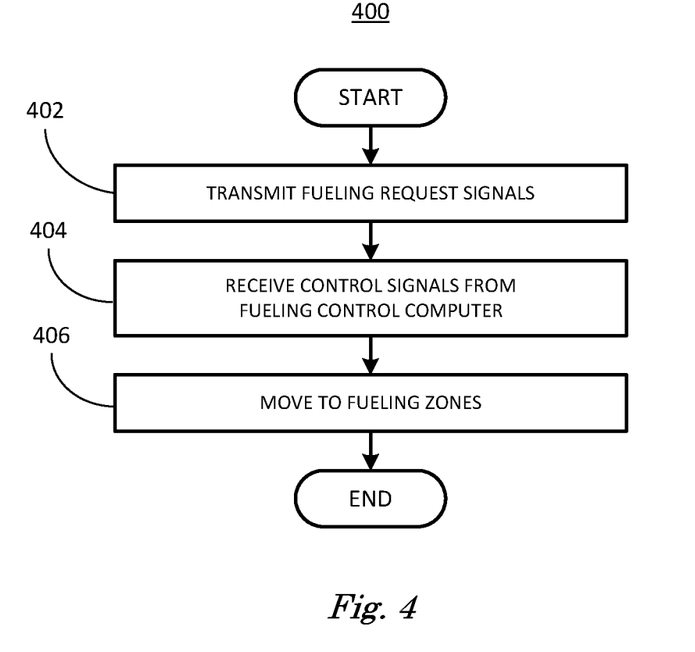
FIG. 4 is a flowchart diagram of a process to move vehicles to fueling zones based on control signals in accordance with disclosed examples.

FIG. 4 is a flowchart diagram of a process 400 for refueling vehicles 110 in autonomous operation described in relation to FIGS. 2 and 3. Process 400 can be implemented on computing device 115, inputting information from sensors 116, executing instructions and sending control signals via controllers 112, 113, 114, for example. Process 400 includes multiple steps taken in the disclosed order. Process 400 also includes implementations including fewer steps or can include the steps taken in different orders.

Process 400 begins at step 402, where computing device 115 according to the process 400 transmits one or more fueling request signals to a fueling control computer 202 at a refueling station 200 as illustrated in FIG. 2, where arriving vehicle 204 can transmit one or more fueling request signals to a fueling control computer 202. Arriving vehicle can establish short range communications with fueling control computer 202 via wireless networking, including cellular telephone networks and Wi-Fi via V-to-I interface 111, and dedicated short range communications (DSRC) technology, for example Bluetooth low energy (BLE) (see www.bluetooth.com, Bluetooth SIG, Inc., Aug. 8, 2016), for example, to communicate with fueling control computer 202 having similar networking capability.

An arriving vehicle 204, whether autonomous, semi-autonomous, or occupant piloted, can establish short range communications with fueling control computer 202 and transmit fueling request signals that inform the fueling control computer 202 of the type and amount of fuel requested and the operating characteristics of fueling such as location of fuel input and refueling technique, including automatic or manual.

At step 404 Fueling control computer 202 can receive the fueling request signals and determine fueling control signals including instructions to move to one or more waiting zones 206, one or more service zones 210 or one or more served zones 208 and transmit the fueling control signals to arriving vehicle 204. The fueling control signals can include instructions to move to one or more waiting zones 206, one or more service zones 210. Once an arriving vehicle 204 is refueled, fueling control signals can include instructions to move to or one or more served zones 208.

Fueling control computer 202 can require, for example, that all arriving vehicles 204 be wirelessly networked and capable of autonomous operation. In this case, fueling control signals can include instructions to the computing device 115 to move the vehicle to the indicated zones autonomously. In this manner, arriving vehicles 204 could be queued up in waiting zones 206 to access fuel pumps 212 in service zones 210, and then moved to served zones 208.

This progression is shown in FIG. 3, where arriving vehicle 304 transmits fueling request signals to fueling control computer 302 at a refueling station 300 via wireless networking. Fueling control computer 302 receives fueling request signals from arriving vehicle 304 and processes them to determine fueling control signals to transmit to arriving vehicle 304.

Arriving vehicle 304 can also communicate wirelessly with vehicles 304, 308, 318, 320, which can be included in waiting zones 306, service zones 310, served zones 316 or amenities 326 to coordinate movement of arriving vehicle 304 such as queueing in service zones 310 and parking at amenities 326 with vehicles 304, 308, 318, 320, 328, for example.

Fueling control computer 302 has transmitted fueling control signals wirelessly to move waiting vehicles 308 to waiting zones 306, fueling vehicles 318 to fueling stations 312 at service zones 310 or served vehicles 318 to served zones 316 following refueling. Fueling computer can determine how to move vehicles in order to reduce waiting time for the most vehicles, or other algorithms designed to improve efficiency of service delivery.

Returning to FIG. 4, at step 406 the one or more vehicles 304, 308, 318, 320, 328 receiving fueling control signals from fueling control computer 302 move to or from the appropriate fueling zones, including waiting zones 306, service zones 310 or served zones 316. The vehicles 304, 308, 318, 320 328 in autonomous mode and programmed to follow instructions included in fueling control signals transmitted by fueling control computer 302. Fueling request signals and fueling control signals can include financial information related to refueling, so that payment can be made as the fuel is dispensed.

Once refueling is complete, fueling control computer 302 can transmit fueling control signals to one or more vehicles 304, 308, 318, 320, 328 to either join served vehicles 320 at served zones 316 or depart the refueling station 300, as shown by departing vehicle 324.

In one example, vehicles that are not capable of autonomous operation could be accommodated by fueling control computers 302 if the vehicle could transmit and receive the appropriate signals via wireless network and translate the fueling controls signals into human language, such as "GO TO PUMP 8, PARK WITHIN YELLOW LINES AND OPEN FUEL DOOR", for example. If the occupant pilots the vehicle appropriately and concludes the financial aspects of refueling via wireless network, refueling could be achieved without autonomous control.

At some refueling stations 200, 300, for safety and efficiency, autonomous control of arriving vehicles 204, 304 can be required. Since arriving vehicles 204, 304 can be occupied, and since occupants can have preferences regarding refueling and amenities 214, 326, occupant preferences can be included in fueling request signals. Occupant preferences can include requests to visit amenities 214, 326 in addition to refueling. Amenities 214, 326 include restrooms, restaurants, shops, picnic, pet areas and parking for example. Parking can include handicapped, short-term and rest areas and drop off and pickup areas. Waiting zones 206, 306 can also include parking, for example.

In one example, arriving vehicle 304 can transmit fueling request signals to fueling control computer 302 indicating that arriving vehicle requests a certain amount of a certain type fuel, and has a fueling system with certain operating characteristics. Fueling request signals can include occupant preferences including a request to visit amenities 326 to use a restroom, for example. Fueling control computer 302 can receive and process fueling request signals from arriving vehicle 304 along with fueling request signals from other vehicles 308, 318, 320, 328 and determine fueling control signals to transmit to arriving vehicle 304.

The fueling control signals can include instructions to arriving vehicle 304 to move to a parking space at amenities 326 near a restroom, for example. Occupant preferences can include requests for amenities 326 such as handicapped parking or nearby parking due to inclement weather. Fueling control computer 302 can receive these fueling request signals and transmit fueling control signals that satisfy the occupant's preferences by including instructions to move arriving vehicle to the appropriate amenities 326 or waiting, service or served zones 306, 310, 316.

Once the arriving vehicle 304 is parked at the amenities 326, occupant can exit the arriving vehicle 304 to visit the restroom, for example. Arriving vehicle 304 can transmit a fueling request signal to the fueling control computer 302 indicating the occupant's exit. Fueling control computer 302 can transmit fueling control signals to arriving vehicle 304 instructing arriving vehicle 304 to move to a service zone 310 for refueling.

Since fueling control computer can recall that an occupant associated with arriving vehicle 304 exited the arriving vehicle 304 to visit amenities 326, when refueling is complete for arriving vehicle 304, fueling control computer 302 can send fueling control signals to arriving vehicle 304 including instructions to move to served zones 316 to join served vehicles 320. Fueling control signals can instruct the arriving vehicle 304 to move to a served zone 316 near the amenities 326. In this manner, the arriving vehicle 304 can be positioned so that the occupant can conveniently reoccupy the arriving vehicle 304 and depart the refueling station, as shown by departing vehicle 324.

In this manner, the arriving vehicle 304 can be refueled as soon as the appropriate fueling station 312 is available, thereby optimizing utilization of fueling stations 312 associated with service zones 310 and minimizing a wait for refueling while satisfying occupant preferences associated with refueling station 300 amenities 326. In other cases, where arriving vehicle 304 can be unoccupied or where occupant stays in the arriving vehicle, once refueling is complete arriving vehicle 304 can depart, as shown by departing vehicle 324.

In summary, FIG. 4 illustrates a process 400 for fueling autonomous vehicles with centralized scheduling by transmitting fueling request signals from vehicles 304, 308, 318, 320, 328 to a fueling control computer 302, transmitting fueling control signals from fueling control computer 302 to vehicles 304, 308, 318, 320, 328, and moving vehicles 304, 308, 318, 320, 324 to one or more zones 306, 310, 316 or amenities 326 based on instructions from fueling control computer 302.

Computing devices 115 associated with arriving vehicle 304 can repeat process 400 multiple times at refueling station 300 respectively in order to refuel arriving vehicles 304 while satisfying occupant preferences. For example, arriving vehicles 304 can move amenities 326, drop off occupant then repeat process 400 and move to a waiting zone 306. When a fueling station 312 becomes available, steps 404 and 406 of process 400 can be repeated to move arriving vehicles 304 to one or more fueling stations 312. When fueling is complete, steps 404 and 406 of process 400 can be repeated to move vehicle 304 to serve zones 316 to join served vehicles 320 to wait for occupant to return from amenities, 326 for example, or depart, as shown by departing vehicle 324. Computing devices associated with fueling control computer 302 can also transmit messages via wireless networks to mobile devices such as cell phones to alert occupant that refueling is complete and arriving vehicle 304 is moving to served zone 316.

Figure 5:
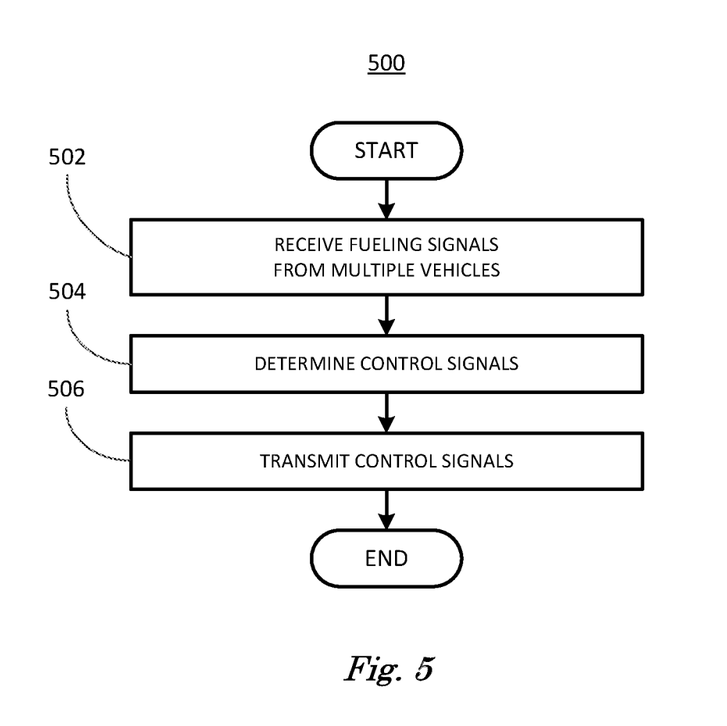
FIG. 5 is a flowchart diagram of a process to determine and transmit control signals for multiple vehicles in accordance with disclosed examples.

FIG. 5 is a flowchart diagram of an example process 500 for centralized scheduling of vehicle 110 refueling for vehicles 110 in autonomous operation described in relation to FIGS. 2 and 3. Process 500 can be implemented on a computing device including a processor and nonvolatile memories such as are known associated with fueling control computer 202, 302, wirelessly networked to vehicles 304, 308, 318, 320, 324 as described above. Process 500 includes multiple steps taken in the disclosed order. Process 500 also includes implementations including fewer steps or can include the steps taken in different orders.

Process 500 begins at step 502, where fueling control computer 302 receives fueling request signals from vehicles 304, 308, 318, 320, 328 via wireless network. Request signals can include fueling request information and occupant preference information. At step 504 fueling control computer 302 determines control signals including instructions to move to certain zones 306, 310, 316 for the vehicles 304, 308, 318, 320, 328.

The control signals can be determined based on probability theory regarding servicing clients arriving at random intervals to minimize wait times, constrained by the occupant requests, for example. Large numbers of requests and limited resources can mandate queuing. Fueling control computer can manage queues for service zones 310 and for amenities 326 associated with refueling station 300, for example. Service at a service zone can include refueling at a fueling station 312 and amenities 326 can include restrooms, restaurants, shops, picnic, pet areas and parking for example. Parking can include handicapped, short-term and rest areas and drop off and pickup areas.

Vehicles 308 in waiting zones 306 can be in queues waiting for parking or service, for example. Queues can be managed on a first-in, first-out basis. Single queues for multiple identical resources can be implemented to minimize average wait times, for example. Queues can change dynamically as vehicles 304, 308, 318, 320, 328 enter and exit refueling station 300 and transmit new fueling request signals to fueling control computer 302. This can require transmitting new fueling control signals to vehicles 304, 308, 318, 320, 328.

At step 506 the fueling control computer 302 transmits the fueling control signals to the vehicles 304, 308, 318, 320, 328 via wireless network. The fueling control signals include instructions to move one or more of vehicles 304, 308, 318, 320, 328 to one or more of zones 306, 310, 316 so as to optimize refueling while satisfying occupant preferences. Fueling control computer 302 can monitor vehicles 304, 308, 318, 320, 324 via wireless network to determine compliance with the transmitted instructions, for example. Other techniques for monitoring compliance with transmitted instructions include video or other sensors, for example.

In summary, FIG. 5 is a process 500 for centralized scheduling of autonomous vehicle scheduling by a fueling control computer 302 operative to receive fueling request signals from vehicles 304, 308, 318, 320, 328, optimally schedule refueling while satisfying occupant preferences by transmitting fueling control signals to vehicles 304, 308, 318, 320, 328 instructing them to move to zones 306, 310, 316 and amenities 326.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
  receiving, in a fueling control computer, fueling request signals from a plurality of vehicles; and
  providing one or more control signals from the fueling control computer to respective vehicles in the plurality of vehicles in response to the fueling request signals;

wherein the control signals are determined based on minimizing fueling times for the plurality of vehicles according to an order in which the fueling request signals were received while meeting occupant preferences;

wherein the control signals instruct one or more of the vehicles in the plurality of vehicles to move to one or more fueling zones.

2. The method of claim 1, wherein one or more fueling request signals specify occupant preferences.

3. The method of claim 1, wherein one or more fueling request signals specify at least one of a type or amount of fuel requested.

4. The method of claim 1, wherein one or more fueling request signals specify a location of a vehicle fuel input.

5. The method of claim 1, wherein one or more fueling request signals specify whether an occupant has exited the vehicle that sent the respective fueling request signal.

6. The method of claim 1, wherein the one or more fueling zones include a waiting zone, a service zone, and a served zone.

7. The method of claim 1, wherein the control signals are transmitted via a wireless network.

8. An apparatus, comprising:
a processor; and
a memory, the memory storing instructions executable by the processor to:
receive fueling request signals from a plurality of vehicles; and
provide one or more control signals to respective vehicles in the plurality of vehicles in response to the fueling request signals;
wherein the control signals are determined based on minimizing fueling times for the plurality of vehicles according to an order in which the fueling request signals were received while meeting occupant preferences;
wherein the control signals instruct one or more of the vehicles in the plurality of vehicles to move to one or more fueling zones.

9. The apparatus of claim 8, wherein the instructions further include instructions to determine occupant preferences from the one or more fueling request signals.

10. The apparatus of claim 8, wherein the instructions further include instructions to determine least one of a type or amount of fuel requested from the one or more fueling request signals.

11. The apparatus of claim 8, wherein the instructions further include instructions to determine a location of a vehicle fuel input from the one or more fueling request signals.

12. The apparatus of claim 8, wherein the instructions further include instructions to determine whether an occupant has exited the vehicle that sent the respective fueling request signal.

13. The apparatus of claim 8, wherein the one or more fueling zones include a waiting zone, a service zone, and a served zone.

14. The apparatus of claim 8, wherein the control signals are transmitted via a wireless network.

15. An apparatus, comprising:
a processor; and
a memory, the memory storing instructions executable by the processor to:
transmit a first fueling request signal from a vehicle to a fueling control computer; and
receive, from the fueling control computer, one or more control signals in response to the fueling request signal;
wherein the control signals are determined based on minimizing fueling times for a plurality of vehicles according to an order in which fueling request signals, including the first fueling request signal, were received while meeting occupant preferences;
wherein the control signals instruct one or more of the vehicles in the plurality of vehicles to move to one or more fueling zones.

16. The apparatus of claim 15, wherein the fueling request signals specify occupant preferences.

17. The apparatus of claim 15, wherein one or more of the fueling request signals specify at least one of a type of fuel requested, an amount of fuel requested, or a location of a vehicle fuel input.

18. The apparatus of claim 15, wherein one or more of the fueling request signals specify whether an occupant has exited the vehicle.

19. The apparatus of claim 15, wherein the one or more fueling zones include a waiting zone, a service zone, and a served zone.

20. The apparatus of claim 15, wherein the first fueling request signal is transmitted via a wireless network.

* * * * *